United States Patent
Kane

(10) Patent No.: US 6,535,334 B2
(45) Date of Patent: Mar. 18, 2003

(54) POLARIZATION CONVERSION SYSTEM FOR PROJECTION DISPLAYS RESISTANT TO DAMAGE FROM HEAT AND LIGHT

(75) Inventor: Robert H. Kane, Ho-Ho-Kus, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/827,066

(22) Filed: Apr. 5, 2001

(65) Prior Publication Data

US 2002/0145800 A1 Oct. 10, 2002

(51) Int. Cl.[7] ............................................... G02B 27/28
(52) U.S. Cl. ........................ 359/485; 359/483; 359/487
(58) Field of Search ............................. 359/487, 488, 359/497, 500, 483, 485, 494; 362/19

(56) References Cited

U.S. PATENT DOCUMENTS

| | | | | |
|---|---|---|---|---|
| 2,748,659 A | * | 6/1956 | Geffken et al. ............. | 359/487 |
| 3,935,444 A | * | 1/1976 | Zechnall et al. ............ | 359/487 |
| 5,650,873 A | | 7/1997 | Gal et al. .................... | 359/487 |
| 6,084,714 A | * | 7/2000 | Ushiyama et al. .......... | 359/487 |
| 6,144,492 A | | 11/2000 | Iwamura et al. ............ | 359/487 |

FOREIGN PATENT DOCUMENTS

| | | | | |
|---|---|---|---|---|
| EP | 0829739 A1 | | 3/1998 | ............ G02B/5/30 |
| JP | 03-120503 A | * | 5/1991 | ................. 359/485 |
| JP | 04-315105 A | * | 11/1992 | ................. 359/500 |
| JP | 05-323118 A | * | 12/1993 | ................. 359/487 |
| WO | WO 0073824 | | 7/2000 | ............ G02B/5/30 |

* cited by examiner

Primary Examiner—John Juba, Jr.

(57) ABSTRACT

A polarization conversation device (PCS) wherein a series of slots are formed in a frame to orient coated glass plates with retarder elements positioned there between. The PCS components are assembled within the frame and cover plates are secured thereto in a fluid-tight manner forming a fluid tight enclosure for receiving an index-matching fluid for homogenizing the temperature at any bright spots.

10 Claims, 2 Drawing Sheets

POLARIZATION CONVERSION SYSTEM FOR PROJECTION DISPLAYS RESISTANT TO DAMAGE FROM HEAT AND LIGHT

TECHNICAL FIELD

The present invention relates generally to polarization conversion systems for use in projection displays and, more particularly, to a polarization conversion system having an improved longevity, a reduced number of piece parts, lower fabrication costs and simplified component alignment.

BACKGROUND TECHNOLOGY

Polarization conversion systems (PCS) are utilized in display projectors requiring polarized light for operation. The polarization conversion device (PCS) is positioned in the optical path after the illuminator and splits the light into two orthogonal polarization states rotating one to produce a combined beam of nearly uniform polarization.

There is in use today a compact PCS which utilizes a cemented array of rhombic glass prisms having prescribed beam splitting coatings for separating polarization states, mirror coatings to redirect the reflected split beam, and half-wave structures to rotate the reflected split beam. This is the typical function that a PCS is to perform.

The half-wave plates utilized in this structure are typically polymeric foils glued to the appropriate prism segments, and the glass prisms of the PCS are also assembled using an adhesive.

Because the adhesives commonly used in such existing PCS are affected by heat or radiation from the projection system illuminator, the performance of such a PCS has been found to degrade with service time. Such PCS units are fabricated of precisely ground and polished glass which is held together by adhesives which are found to degrade over a prolonged period of service time because of the exposure to the illuminator radiation. Therefore, while such PCS units are satisfactory in certain respects, they do tend to degrade with service time because of this exposure to heat or radiation from the system illuminator. Accordingly, the present invention is directed to overcoming one or more of the problems or disadvantages associated with the relevant technology.

SUMMARY OF THE INVENTION

In the preferred embodiment of this invention, the use of adhesives between the glass elements of the PCS is eliminated, and the polymer retarder foils and the adhesives used, if any, are immersed in a fluid which homogenizes the temperature at bright spots. Because the optical elements used with these PCS units are formed from pre-scribed glass sheets, which may be coated in large sections prior to being broken to the size specified, no grinding or polishing is required, nor is any treatment required of the edges. In this manner a polarization conversion system which is constructed in accordance with this invention will have improved longevity, a reduced number of parts which will simplify component alignment and will be less expensive to fabricate.

BRIEF DESCRIPTION OF THE DRAWINGS

In the accompanying drawings, like reference numerals indicate corresponding parts throughout.

BEST MODE FOR CARRYING OUT THE INVENTION

Figure 1:
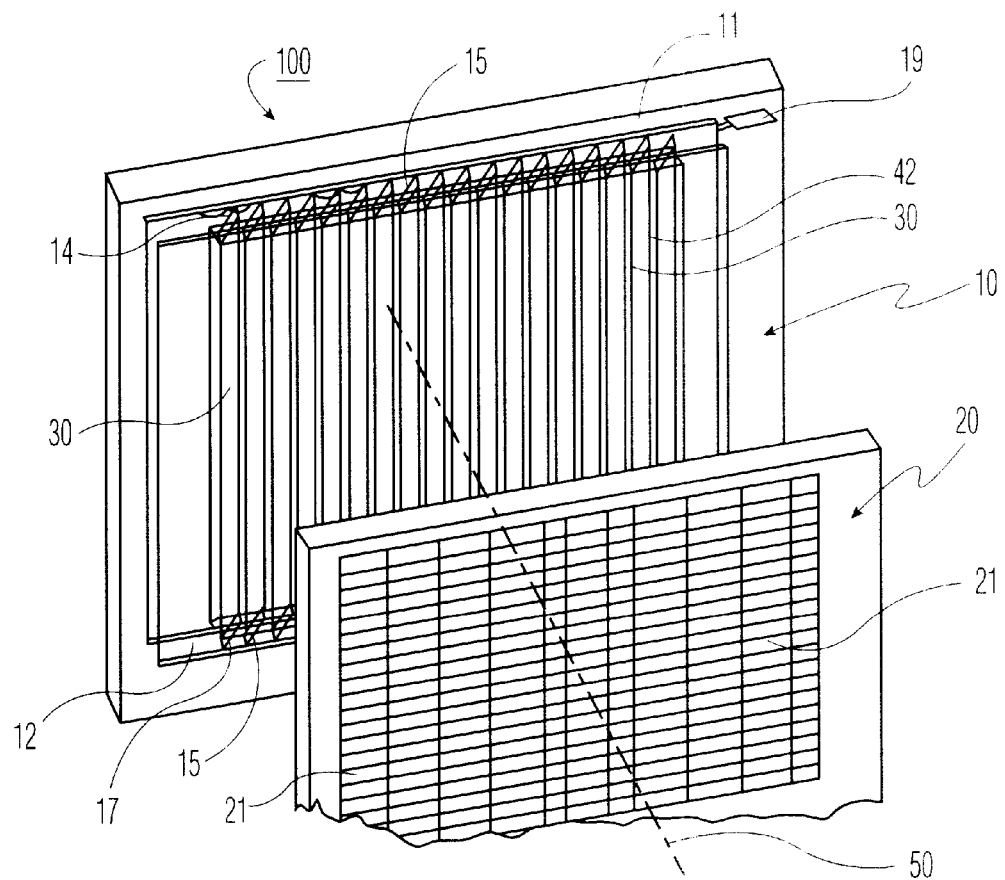
FIG. 1 is a perspective view of a polarization conversion device constructed in the manner of this invention with the cover element removed to better illustrate the component parts thereof.

Referring now to the drawings, the following is a description of a preferred embodiment of the invention wherein a series of slots are formed in the frame of the polarization conversion device (PCS) to orient coated glass plates with retarder elements positioned there between. The PCS components are assembled within the frame and cover plates are secured thereto in a fluid-tight manner forming a fluid tight enclosure for receiving therein an index-matching fluid for maintaining correct optical path length, reducing internal reflections, and homogenizing the temperature at any bright spots.

Referring first to FIG. 1, there is illustrated a PCS 100 including a frame 10, preferably molded of a glass-reinforced polymer, formed with a series of slots 15 across top and bottom headers, 11 and 12 respectively, in which are received coated thin glass plates 30, oriented by the slots 15 at a 45 degree angle to the optical axis 50 of the projector, not shown. A frame front cover plate 20, the entry window of the PCS 100, may be formed as the second element of a typical optical integrator which comprises a lenslet 21 array functioning to split the light beam from a lamp, not shown, into a large number of sub-beams providing a well defined light distribution across the beam-splitting segments of the PCS 100. The rear face of the front cover plate 20 may have deposited thereon a patterned mask 22, deposited by vapor deposition, or a foil mask positioned to function as an aperture grill to prevent light from leaking past the beam-splitting coated segments and to shield the mirror coated segments from the direct light beam. The frame 10 itself is formed of a size sufficient so that it does not interfere with the optics, but remains outside the light path.

Figure 2:
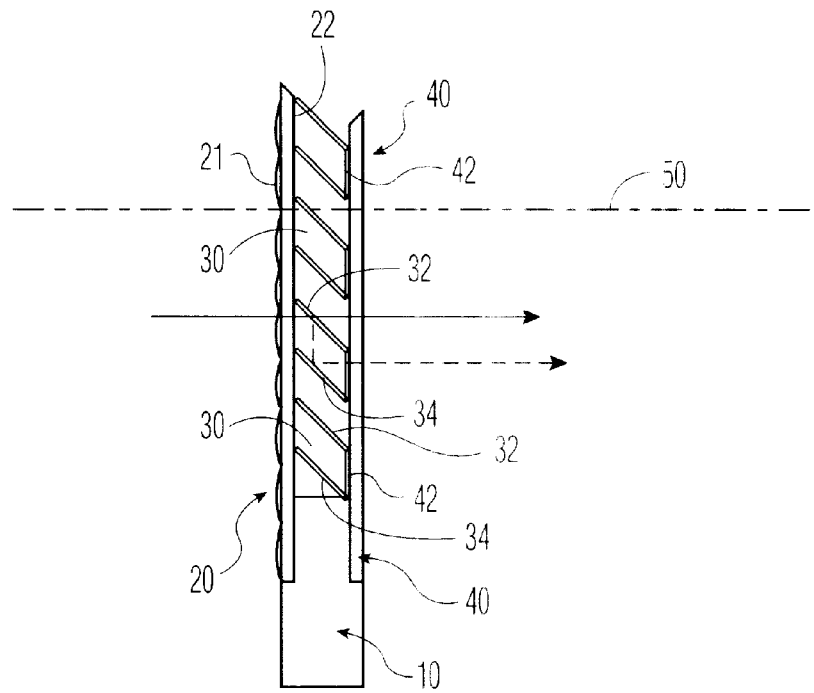
FIG. 2 is an enlarged top cross-sectional view of an end portion of the polarization conversion device illustrated in FIG. 1 to better illustrate the components of the polarization conversion device and the manner in which they are assembled.
Figure 3:
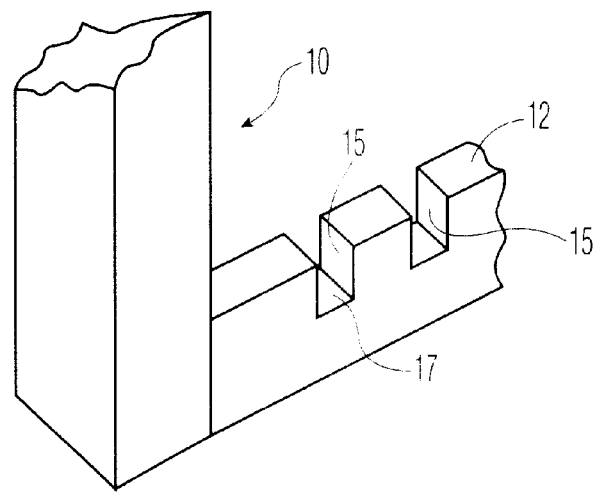
FIG. 3 is an enlarged partial perspective view of a portion of the frame in which slots are formed to position the glass plates.

The glass plates 30, which may be formed from a thin plate of BK7 glass which is scribed and broken into the desired size, are alternatively coated with a polarizing beam-splitting coating 32 for separating polarization states, and a mirror coating 34 to re-direct the reflected split beam parallel to the optical axis. Mirror coating 34 may have the same reflection characteristics of coating 32, as we can understand from the operation of the PCS, or may be a true mirror. Half-wave retarder plates 42, a polymeric foil of a type known to those skilled in the art and which are not required to be anti-reflection coated, are attached to the frame rear cover plate or exit window 40, in spaced positions to be adjacent to the rear edge of each alternate pair of the glass plates 30, as best illustrated in FIG. 2. These retarder plates 42 are secured to the PCS exit window 40 by an adhesive layer having a refractive index matched to the glass plates 30 or by glue patches positioned above and below the light path. When such glue patches are utilized, it is preferable that the foil retarder plates 42 be registered against the exit window 40 by the edges of the plates while allowing a thin fluid layer between plates 42 and window 40.

The frame 10 so formed is fluid tight so that the glass plates 30 and retarder foils 42 are immersed in a fluid having an refractive index matched to that of the glass plate substrate. The presence of such a fluid will eliminate the need for antireflection coatings, homogenize the temperature within the PCS to minimize or eliminate hot spots, and a relatively high refractive index will facilitate maximum polarization conversion efficiency.

Vertical thermal expansion of the glass plates 30 can be accommodated by the use of spring fingers 40 molded into the frame structure and positioned out of the optical path, by forming the slots 15 across the top and the bottom headers of the frame, 11 and 12, respectively, of a depth sufficient to permit free expansion in the plane of the glass plates 30, or by the use of a compliant adhesive 17 in the slots 15. Thermal expansion of the fluid contained within the frame 10 may be accommodated by a reservoir 19 carried in fluid communication therewith by the frame 10 and positioned out of the optical path.

Functional Description

The PCS 100 of this invention provides a lower cost device which is more easily fabricated through the use of pre-coated glass plates 30 which are readily oriented in slots 15 formed in the device frame 10. The use of adhesives is minimized or eliminated, and the retarder plates 42 are positioned on and carried by the frame exit window 40 in alignment with the edges of the glass plate 30. The assembled PCS 100 is fluid tight and filled with a fluid having a refractive index matched to that of the glass plate 30 substrate. In this manner the temperature within the PCS is homogenized.

Other aspects and features of the present invention can be obtained from a study of the drawings, the disclosure, and the appended claims.

What is claimed is:

1. A polarization conversion device for converting a non-polarized beam of light into a beam of more uniform polarization, comprising;
   a support frame for supporting and positioning a plurality of light polarizing elements in predetermined positions relative to the non-polarized beam of light for converting said non-polarized beam of light into a beam of light having a more uniform polarization;
   said support frame having pre-formed portions for receiving and positioning each one said plurality of light polarizing elements in said predetermined positions;
   said pre-formed portions of said support frame comprising slots formed therein to position each of said plurality of light polarizing elements at substantially a 45 degree angle relative to the beam of non-polarized light;
   a plurality of light polarizing elements adapted to be received and positioned in said pre-formed portions of said support frame;
   support frame cover means a fluid tight enclosure about said support frame;
   a fluid contained within said fluid tight enclosure having a refractive index substantially equal to the refractive index of said light polarizing elements; and
   said plurality of light polarizing elements comprising glass plates having opposite parallel faces of a light beam splitting surface and a light beam reflecting surface,
   wherein said light polarizing elements are positioned so that each said light beam splitting surface is paired with a light beam reflecting surface adjacent and parallel thereto.

2. The polarization conversion device of claim 1 further including a half-wave retarder positioned between each alternate pair of said parallel light beam-splitting surfaces and light beam reflecting surfaces.

3. The polarization conversion device of claim 2 further including a mask to prevent light from leaking past said beam-splitting surfaces and to shield said light beam reflecting surfaces from direct light.

4. The polarization conversion device of claim 3 further including a lenslet array of an optical integrator positioned in the beam of non-polarized light before said beam is received by said plurality of light polarizing elements.

5. The polarization conversion device of claim 4 further including means for compensating for thermal expansion of said light polarizing elements.

6. The polarization conversion device of claim 5 further including means for compensating for thermal expansion of said fluid contained in said fluid tight enclosure.

7. In a polarization conversion device wherein a beam of non-polarized light is passed in an optical path of substantially uniform distribution to a plurality of polarizing beam splitting elements which pass, reflect and rotate portions of the non-polarized light passed thereto for passing therefrom a beam of light having a substantially uniform polarization, the improvement comprising:
   a plurality of glass support plates positioned in the optical path of the beam of substantially uniformly distributed non-polarized light;
   each one of said glass support plates having a light beam splitting surface through which light in a first polarized state is passed and light not in said first polarized state is reflected;
   each one of said plurality of glass support plates having a light beam reflecting surface parallel to said light beam splitting surface, said glass support plates being positioned so that each of said light beam splitting surfaces is paired with a light beam reflecting surface adjacent and parallel thereto;
   a light wave retarder positioned between each alternate pair of said light beam splitting surface and each one of said light beam reflecting surface to rotate the reflected light to said first polarized state upon passage therethrough; and
   a fluid having a refractive index substantially the same as the refractive index of said glass support plates immersing said plurality of glass support plates therein.

8. The polarization conversion device of claim 7 wherein the improvement further includes a support frame having a plurality of pre-formed receptacles for receiving and retaining said glass support plates in a pre-determined orientation relative to said beam of non-polarized light passed in an optical path of substantially uniform distribution thereto.

9. The polarization conversion device of claim 7 wherein said light beam splitting surface which reflects light not in a first polarized state reflects said light orthogonally to the polarized light passed therethrough; and
   said light wave retarder is a half-wave retarder.

10. A polarization conversion device for converting a non-polarized beam of light into a beam of more uniform polarization, comprising:
   a support frame for supporting and positioning a plurality of light polarizing elements in predetermined positions for insertion into the optical path of a beam of light to be polarized;
   said support frame having pre-formed portions for receiving and positioning each one of said plurality of light polarizing elements in predetermined positions relative to said support frame;

each one of said light polarizing elements including a glass support plate adapted to be received and positioned by one of said preformed portions of said support frame for receiving the light beam passed thereto;

each glass support plate having a light beam splitting surface through which light in a first polarized state is passed and light not in said first polarized state is orthogonally reflected;

each glass support plate having a light beam reflecting surface parallel to said light beam splitting surface, said glass support plates being positioned so that each of said light beam splitting surfaces is paired with a light beam reflecting surface adjacent an parallel thereto;

a half-wave retarder positioned between each alternate pair of light beam splitting surface and light beam reflecting surface to rotate the orthogonally reflected light to said first polarized state upon passage therethrough;

a front frame cover plate in fluid tight sealing engagement with said support frame for passing a beam of light to each glass support plate;

a rear frame cover plate in fluid tight sealing engagement with said support frame for passing a polarized light beam exiting from each glass support plate; and a fluid having a refractive index substantially matching the refractive index of said glass support plates contained within said support frame and immersing said glass support plates positioned therein.

* * * * *